March 26, 1940. C. W. MALIPHANT 2,194,762
SPEED CONTROLLED BRAKE
Filed Oct. 8, 1937

INVENTOR
CHARLES W. MALIPHANT
BY Wm. H. Cady
ATTORNEY

Patented Mar. 26, 1940

2,194,762

UNITED STATES PATENT OFFICE 2,194,762

SPEED CONTROLLED BRAKE

Charles W. Maliphant, Wilmerding, Pa., assignor to The Westinghouse Air Brake Company, Wilmerding, Pa., a corporation of Pennsylvania Application October 8, 1937, Serial No. 167,999

15 Claims. (Cl. 303—21)

This invention relates to vehicle brakes and particularly to vehicle brakes controlled automatically according to the speed of the vehicle.

Various vehicle brake equipments have been proposed whereby the degree of braking force with which the brakes are applied is controlled automatically according to the speed of the vehicle. Some of these equipments are quite complicated in construction and present numerous problems in the installation and application of the braking equipment to vehicles or cars.

It is an object of my present invention to provide a brake equipment wherein the control according to speed is effected in a novel manner.

More specifically, it is an object of my invention to provide, in a brake control equipment, two connected self-synchronizing motors, which may be of the familiar "Selsyn" type, one of which is conditioned at all times according to the speed of the vehicle and the other of which is controlled by and positioned according to the condition of the first self-synchronizing motor, to control the degree of application of the brakes.

The above objects, and other and more specific objects, which will be made apparent in the subsequent description of my invention, are attained by means of several illustrative embodiments of brake equipments shown in the accompanying drawing, wherein.

Figure 1:
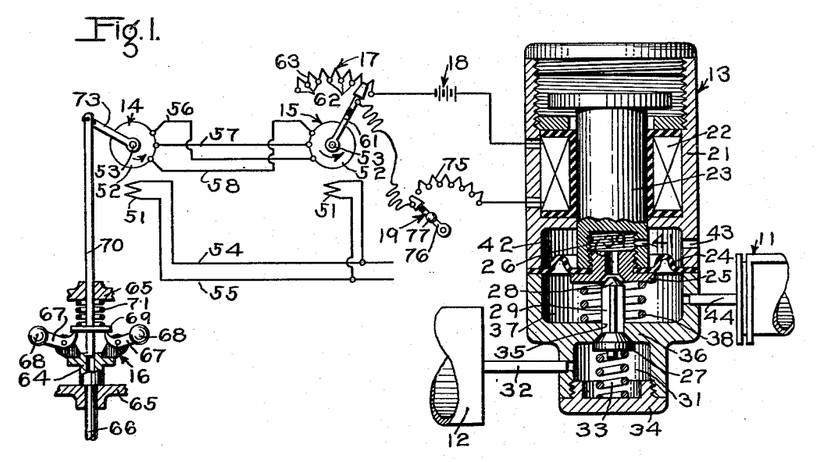
Fig. 1 is a diagrammatic simplified view of a brake control equipment embodying my invention.

*Description of embodiment shown in Fig. 1*

The equipment shown in Fig. 1 comprises a brake cylinder 11, a reservoir 12, a self-lapping magnet valve device 13 for controlling the supply of fluid under pressure from the reservoir 12 to the brake cylinder 11 and the release of fluid under pressure from the brake cylinder 11, and according to my invention, a pair of self-synchronizing motors 14 and 15, a governor device 16 for controlling one of the motors, such as the motor 14, and hereinafter referred to as the transmitter motor, a rheostat 17 operated by the other of the self-synchronizing motors 15 hereinafter called the receiver motor, and an energizing circuit for the magnet valve device 13 including the rheostat 17, a source of electrical energy such as a battery 18, and a brake control switch 19.

Considering the parts of the equipment in greater detail, the self-lapping magnet valve device 13, which is of well known construction, may comprise a suitable casing 21 containing a solenoid or electromagnet winding 22, a plunger 23 of magnetic material which is shifted to different positions according to the degree of energization of the magnet winding 22, a movable abutment such as a circular diaphragm 24, clamped in the casing along the periphery thereof and secured to the lower end of the stem or plunger 23 by means of a flanged screw 25 the threaded portion of which extends through a central opening in the diaphragm and screws into a threaded bore or recess 26 in the lower end of the plunger 23. The magnet valve device 13 also comprises a supply valve 27, of the poppet type, and a release valve 28 of the pin type, integrally joined and formed preferably at opposite ends of a fluted stem 29, the valves being operated by movement of the plunger 23.

The supply valve 27 is contained in a chamber 31 of the casing, to which the reservoir 12 is constantly connected as by a pipe 32, and is normally yieldingly urged into seated relation on an associated valve seat by a coil spring 33 contained in the chamber 31 and interposed between the valve 27 and a cap screw 34 closing the open end of the chamber 31.

The fluted stem 29 of the supply valve 27 extends through an opening or bore 35 in a wall 36 of the casing 21 into a chamber 37 which is formed between the wall 36 and the lower face of the diaphragm 24. A coil spring 38 concentrically surrounding the fluted stem 29 and interposed between the wall 36 and the cap screw 25 at the lower end of the plunger 23 yieldingly resists downward movement of the plunger 23 and normally positions the plunger 23 so that the release valve 28 is unseated from an associated valve seat, formed on the cap screw 25, to open a port 39 in the cap screw which connects the chamber 37 to atmosphere. The interior of the recess 26 at the lower end of the plunger 23 is open through a port 41 to an annular chamber 42 at the upper side of the diaphragm 24 which is constantly open to atmosphere through an exhaust port 43. Thus, when the release valve 28 is unseated from its associated valve seat on the cap screw 25, the chamber 37 and the brake cylinder 11, which is connected to the chamber 37 through a pipe 44, are vented to atmosphere past the unseated release valve 28 through the port 39, recess 26, port 41, chamber 42 and exhaust port 43.

When the magnet winding 22 is energized sufficiently to overcome the resisting force of the spring 38, the plunger 23 moves downwardly to cause the release valve 28 to seat on its associated valve seat and thus close the exhaust communication from the brake cylinder to atmosphere. When the degree of energization of the magnet winding 22 is further increased, plunger 23 moves further downwardly against the combined resisting force of the springs 38 and 33 and unseats the supply valve 47 to open communication between the chambers 31 and 37 and thus cause fluid under pressure to be supplied from the reservoir 12 to the brake cylinder 11.

When the pressure of the fluid supplied to the brake cylinder 11 and acting in chamber 37 on the lower face of the diaphragm 24 increases sufficiently that the upward force exerted thereby on the plunger 23 substantially counterbalances the magnetic force urging the plunger 23 downwardly, spring 38 becomes effective to shift the plunger 23 upwardly sufficiently to enable the spring 33 to reseat the supply valve 27 and thus close off the further supply of fluid under pressure to the brake cylinder 11. With the supply of pressure to the brake cylinder 11 cut off no further upward movement of the plunger 23 occurs and thus the release valve 28 remains seated to prevent the exhaust of fluid under pressure from the brake cylinder 11 to atmosphere.

If the magnet winding 22 is energized to a greater degree, that is, by a higher energizing current, the plunger 23 is again urged downwardly by the magnetic force exerted thereon and supply valve 27 is again unseated to cause further fluid under pressure to be supplied to the brake cylinder 11 until the pressure of the fluid in the chamber 37 substantially counterbalances the downwardly exerted magnetic force on the plunger 23, at which time the supply valve 27 is again seated while the release valve 28 remains seated.

It will thus be apparent, upon analysis, that the degree of pressure established in the brake cylinder 11 depends upon and is in accordance with the degree of current energizing the magnet winding 22 of the self-lapping magnet valve device 13.

The construction and the theory of operation of self-synchronizing motors is well understood by those skilled in the art and it is, therefore, deemed necessary to show the motors 14 and 15 only diagrammatically. The motors 14 and 15 are identical in construction and each comprises a stator field winding 51 and a rotor 52 having thereon a three-phase Y-connected winding, the connection to the terminals of the three-phases of the rotor winding being effected by means of three suitable slip rings, not shown, on the rotor shaft 53. The stator windings 51 of the two motors 14 and 15 are connected in parallel relation to the same circuit, which may be a single-phase, one hundred and ten volt, sixty cycle, alternating-current circuit having the two supply wires 54 and 55.

The three terminals of the Y-connected winding on the rotor 52 of the motor 14 are connected by three separate wires 56, 57 and 58 to corresponding terminals of the like Y-connected winding on the rotor 52 of the motor 15.

In operation, with the stator field winding 51 of the two self-synchronizing motors 14 and 15 energized, the rotor 52 of the motor 15 is always positioned according to the position of the rotor 52 of the motor 14. If the rotor 52 of the motor 14 is rotated on its shaft 53 through an angle, the rotor 52 of the motor 15 is simultaneously rotated through a corresponding angle in a corresponding direction.

The theory of operation of self-synchronizing motors 14 and 15 is that the single-phase current in the stator windings 51 induces voltage in the three legs of the Y-connected winding on the rotor 52. The voltages induced in the different legs are not equal in magnitude and vary with the position of the rotor. When the rotors of the two motors 14 and 15 are in exactly corresponding positions, the voltages induced in corresponding legs of the rotor winding of the two motors are equal and opposite, that is, they are balanced and thus no current flows through the wires 56, 57 and 58 connecting the windings. If, however, the rotor 52 of the motor 14 is shifted through an angle or rotated, the voltages induced in the corresponding legs of the rotor windings are different and thus current flows in the wires 56, 57 and 58 and through the various legs of the Y-connected windings to cause a torque to be exerted on the rotors.

With the rotor 52 of the motor 14 held in its displaced position, the torque exerted thereon is without effect, but since the rotor 52 of the motor 15 is permitted to rotate or move freely, the torque exerted thereon causes the rotor to turn to a degree and at a speed corresponding to the degree of displacement of the rotor 52 of the motor 14 or the speed of rotation thereof, and it finally comes to rest at a position substantially the same as that assumed by the latter rotor.

According to my invention, I employ a governor 16 to rotarily shift the rotor 52 of the motor 14 over a limited angle to different rotary positions, according to the speed of the vehicle, and the rotor 52 of the motor 15 to correspondingly shift the arm 61 of the rheostat 17 to different taps 62 along the resistor 63 of the rheostat.

Since the motor 14 controls the position of the motor 15, the motor 14 will be referred to herein as the transmitter motor and the motor 15 as the receiver motor.

The governor 16 has been diagrammatically shown as comprising a rotary element 64 which is rotatably supported in a casing 65, a portion of which is shown, and fixed on a shaft 66 that is rotated according to the speed of the vehicle, as through a driving mechanism, such as a gear train or an endless belt, connecting the shaft to an axle of the car. The rotary element 64 carries a plurality of levers 67 pivoted thereon and weighted at the outer ends thereof, as by fly-balls 68.

When the rotary element 64 is rotated, the fly-balls 68 move outwardly as the speed of rotation increases and the inner ends of the levers 67 engage the lower face of a collar or flange 69 fixed to a stem or rod 70 suitably guided in the casing 65, to cause the stem 70 to be shifted upwardly against the yielding resisting force of a coil spring 71 which is interposed between the casing 65 and the upper face of the flange 69.

The upper end of the stem 70 is suitably pivoted to an arm 73 which is keyed or otherwise suitably fixed to the shaft 53 of the rotor 52 of the motor 14. It will thus be apparent that when the vehicle is traveling at a high speed, the stem 70 is raised, for example, to the position shown in Fig. 1. As the speed of the vehicle reduces, the spring 71 becomes effective to shift the stem 70 downwardly and thus through the arm 73 effects a corresponding shifting of the rotor 52 of the motor 14 in a counterclockwise direction as indicated by the arrow. When the vehicle reduces below a certain uniform low speed, beyond which the spring 71 is ineffective to produce further downward movement of the stem 70 the rotor 52 of the transmitter motor 14 remains thereafter in a certain uniform position.

The brake control switch 19 is shown in the form of a manually operable rheostat comprising a resistor 75 with a plurality of taps and a pivoted arm 76 which is provided with a handle 77 adapted to be grasped by the hand of the operator for shifting the arm 76 from a normal disengaged position into engagement with the end tap on the resistor 75 to complete the simple circuit shown in the drawing for energizing the magnet winding 22 of the self-lapping magnet valve device 13, which circuit includes battery 18 and the rheostat 17 operated by the receiver motor 15.

*Operation of embodiment shown in Fig. 1*

Let it be assumed that the vehicle is traveling along the road at a relatively high speed with the brakes released, that is, with the brake control switch 19 in open position and with the governor 16 in the position shown. Obviously, with the brake control switch 19 in open position, the magnet winding 22 of the self-lapping magnet valve device 13 is deenergized and consequently the supply and release valves 27 and 28 are respectively in seated and unseated positions so that the fluid under pressure is released from the brake cylinder 11 and the brakes correspondingly released.

If it is desired to effect an application of the brakes, the operator may shift the arm 76 of the brake control switch 19 into contact with the end tap of the resistor 75 and thus complete a circuit for energizing the magnet winding 22 of the self-lapping magnet valve device 13 to a certain degree. Since the rotor 52 of the receiver motor 15 is positioned according to the position of the rotor 52 of the transmitter motor 14 and since the latter rotor is positioned correspondingly to a relatively high speed, arm 61 of the rheostat device 17 engages a tap 62 of the resistor 63 so as to include a minimum amount of the resistor 63 in the circuit of the magnet winding 22 of the self-lapping magnet valve device 13. The arrangement of the rheostat 17 and its operating motor 15 is such that the amount of the resistor 63 included in the circuit of the magnet winding 22 of the self-lapping magnet valve device 13 decreases, as the speed of the vehicle increases, and when the vehicle or car exceeds a certain high speed the amount of resistor 63 included in this circuit is a minimum.

It will thus be apparent that the magnet winding 22 of the self-lapping magnet valve device 13 is energized to a relatively high degree with the result that a relatively high pressure is established in the brake cylinder 11 by operation of the self-lapping magnet valve device 13.

Now, as the speed of the vehicle reduces, and the governor device 16 operates to shift the arm 73 and connected rotor 52 of the transmitter motor 14 correspondingly in a counterclockwise direction, the rotor 52 of the receiver motor 15 is correspondingly moved and thus the arm 61 of the rheostat 17 is shifted in a counterclockwise direction to include an increasing amount of the resistor 63 of the rheostat 17 in circuit with the magnet winding 22 of the self-lapping magnet valve device 13. Thus, since the pressure established in the brake cylinder 11 varies in accordance with the degree of energization of the magnet winding 22, it will be apparent that the pressure in the brake cylinder will be reduced progressively as the speed of the vehicle is reduced.

When the vehicle speed reduces below a certain uniform low speed and no further shifting of the rotor 52 of the transmitter motor 14 occurs, the arm 61 of rheostat 17 associated with the receiver motor 15 will have shifted sufficiently in the counterclockwise direction to include substantially all of the resistor 63 of the rheostat 17 and thus the magnet winding 22 will be energized to a minimum degree. The brake cylinder pressure and thus the degree of braking force with which the application of the brakes is effected will, correspondingly, be a minimum.

It will be apparent that the operator may select any desired initial degree of brake application by shifting the arm 76 of the brake control switch 19 to include varying amounts of the resistor 75, associated with the brake control switch 19, in the circuit of the magnet winding 22 of the self-lapping magnet valve device 17. Obviously, as the arm 76 of the brake control switch 19 is shifted in a clockwise direction, an increasing amount of the resistor 75 is cut out of the circuit, and thus the magnet winding 22 of the self-lapping magnet valve device 13 will be energized to an increasing degree to establish a correspondingly higher brake cylinder pressure.

When the vehicle comes to a stop, the operator may also shift brake control handle 76 to increase the brake cylinder pressure from that to which it was reduced as the train or vehicle approached the stop, in order to hold the car against creepage on a grade.

Figure 2:
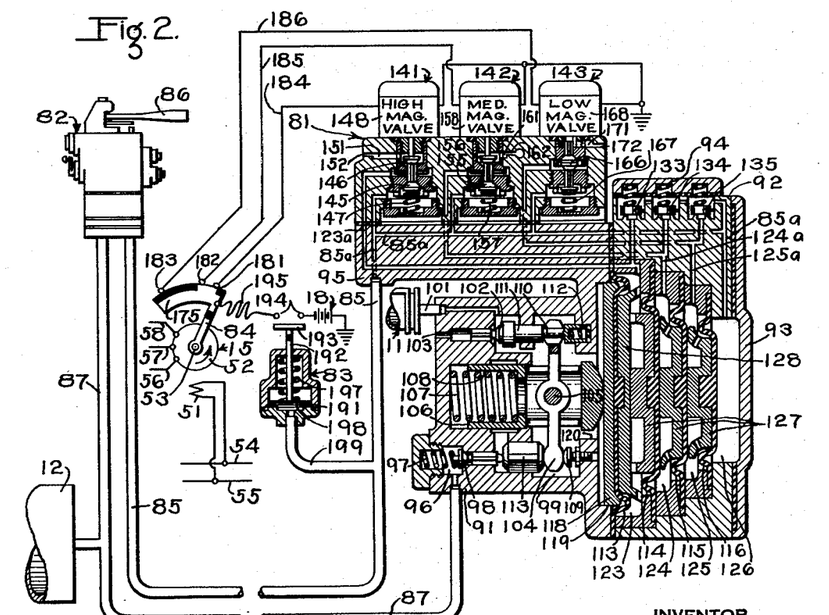
Fig. 2 is a diagrammatic simplified view of a different type of brake control equipment also embodying my invention.

*Description of embodiment shown in Fig. 2*

Referring to Fig. 2, a second embodiment of my invention is shown which differs from that of Fig. 1 in the substitution of a control valve mechanism 81 for the self-lapping magnet valve device 13 and also in having a brake valve device 82, a pressure operated switch device 83, and a contact arm or segment 84 operated by the rotor 52 of the receiver motor 15. The embodiment shown in Fig. 2 includes the same arrangement of self-synchronizing motors 14 and 15 and a governor 16 controlling the motor 14 as in the embodiment shown in Fig. 1, but for simplicity, only the receiver motor 15 is shown.

Considering the parts of the equipment in greater detail, the brake valve device 82, which is illustratively shown as of the so-called combination straight-air and automatic type described and claimed in the copending application Serial No. 105,659, of Ellis E. Hewitt, filed October 15, 1936, and assigned to the assignee of the present application, is provided for controlling the pressure in a pipe 85 hereinafter called the control pipe.

In view of the fact that the brake valve device 82 is described in detail in the copending application mentioned above, it is deemed unnecessary to describe the construction of the brake valve 82 except to explain that it includes a self-lapping valve mechanism the operation of which is effected by an operating handle 86 which is shifted in a horizontal plane through an angle over a so-called application zone. The handle 86 is normally in a brake release position and in such position that the valve mechanism operated thereby effects release of fluid under pressure from the control pipe 85 to atmosphere. As the operating handle 86 is shifted into the application zone from release position, the valve mechanism is operated thereby to establish a pressure in the control pipe 85 corresponding to the degree to which the handle is displaced out of its release position, fluid under pressure being supplied to the control pipe 85 from the reservoir 12 by way of a pipe 87 connecting the reservoir 12 and brake valve device 82 and hereinafter referred to as the supply pipe.

The control valve mechanism 81 represents, in simplified form, a type of valve mechanism described in detail and claimed in copending application, Serial No. 88,098, of Ellis E. Hewitt, filed June 30, 1936, and assigned to the assignee of the present application, certain parts of the valve mechanism being omitted for simplicity. The control valve mechanism 81 comprises a sectional casing having a relay valve section 91, a diaphragm section 92 which is suitably secured to the section 91 as by bolts, not shown, two cover sections 93 and 94 respectively secured to the diaphragm section 92 as by bolts, not shown, and a magnet valve section 95 secured to the valve section 91 as by bolts, not shown.

Formed in the casing section 91 is a chamber 96 which is constantly connected to and charged with fluid under pressure from the supp'y pipe 87. Contained in the chamber 96 is a valve 98, hereinafter designated the supply valve, which is normally yieldingly urged into seated relation on an associated valve seat by a coil spring 97. When the supply valve 98 is unseated, it establishes communication through a bore in which the fluted stem attached to the supply valve 98 is guided, to a chamber 99 in the casing section 91. Chamber 99 is constantly connected to the brake cylinder 11 as through a pipe and passage 101. A valve 102, hereinafter designated the release valve, is provided for controlling the exhaust of fluid under pressure from the brake cylinder 11 and chamber 99 to atmosphere through an exhaust port and passage 103.

The supply valve 98 and the release valve 102 are operated by a lever 104 which is pivoted substantially intermediate the ends thereof, as by a pin 105, on a plunger or stem 106 which is contained in the chamber 99 and suitably supported and guided in the casing section 91. Interposed between the casing section 91 and one end of the plunger 106 is a coil spring 107, the plunger 106 having a recess 108 in the end thereof for receiving the spring 107. The spring 107 yieldingly urges the plunger 106 in the right-hand direction, as seen in Fig. 2, to a maximum extent, the lower end of the pivoted lever 104 engaging a stop screw 109 fixed in the casing section and extending into the chamber 99, thereby causing the lever 104 to rock in a clockwise direction on the pin 105. The upper end of the pivoted lever 104 is bifurcated and straddles a reduced portion 110 of a stem 111 on which the release valve 102 is carried. The upper bifurcated end of the pivoted lever 104 is rounded on opposite sides and thus, while snugly retained between the spaced shoulders at opposite ends of the reduced portion 110, may pivot with respect to the stem 111.

With the lower end of the pivoted lever 104 engaging the stop screw 109 and the plunger 106 urged to a maximum extent in the right-hand direction, the upper end of the lever 104 causes the stem 111 carrying the release valve 102 to be shifted in the right-hand direction against the yielding resistance of a spring 112 interposed between the casing section 91 and the end of the stem 111, to a position such that the release valve 102 is unseated from its associated valve seat on the casing section 91 and the exhaust communication thereby opened from the brake cylinder 11 and chamber 99 to atmosphere through the port 103.

When the plunger 106 is shifted in the left-hand direction from the position shown, the release valve 102 is first seated and then the supply valve 98 is unseated. The spring 97 maintains the supply valve 98 seated with sufficient force to hold the lower end of the pivoted lever 104 against movement, a fluted spacer which is guided in the casing section 91, being interposed between the lower end of the lever 104 and the inner end of the fluted stem of the supply valve 98. Thus, upon the initial movement of the plunger 106 in the left-hand direction, the lever 104 is pivoted in a counterclockwise direction about the lower end thereof to cause the stem 111 to be shifted in the left-hand direction to effect the seating of the release valve 102. After the release valve 102 is seated, the upper end of the lever 104 is held against movement and thus, as the plunger 106 moves further in the left-hand direction, the lever 104 is pivoted in a clockwise direction about the upper end thereof to effect unseating of the supply valve 98 against the force of the spring 97.

When the plunger 106 is moved in a reverse direction back toward the position shown, the spring 97 acts to seat the supply valve 98 and incidentally rock the lever 104 on the pin 105 to maintain the release valve 102 seated. When the plunger 106 is shifted sufficiently in the right-hand direction to permit the supply valve 98 to be seated, further movement of the plunger 106 in the right-hand direction causes the lever 104 to be pivoted in a clockwise direction about the lower end thereof and thus effect unseating of the release valve 102.

The plunger 106 is shifted to effect operation of the supply valve 98 and the release valve 102 by means of a plurality of movable abutments or diaphragms 113, 114, 115 and 116 of successively smaller effective pressure areas in the order named, the diaphragms being disposed in spaced coaxial relation and suitably clamped along the periphery thereof in the casing section 92.

Suitably supported in a bore 119 in the casing section 91 is a follower disc 118 associated with the outer face of the largest diaphragm 113. The bore 119 is connected to the chamber 99 of the casing section 91 through an opening 120 and the head end of the plunger 106 extends through the opening 120 into contact with the follower disc 118 substantially coaxially with the diaphragms 113 to 116.

The arrangement of the diaphragms 113 to 116 in the casing section 92 is such as to form a chamber 123 between the diaphragms 113 and 114, a chamber 124 between the diaphragms 114 and 115, a chamber 125 between the diaphragms 115 and 116, and a chamber 126 between the diaphragm 116 and the cover section 93, the latter chamber being constantly connected through a passage 85a to the control pipe 85.

In order to maintain a minimum spacing between diaphragms, flanged follower discs or spacers 127 are provided, each suitably affixed to one face of the diaphragms 114, 115 and 116 without perforating the diaphragm. A flanged follower disc 128 is suitably affixed to the inner face of the largest diaphragm 113 without perforating the diaphragm, the flange of the disc 128 being flared slightly so as to engage a stop shoulder 129 on the casing section 92 to limit the movement of the diaphragm 113 in the right-hand direction by the plunger 106.

It should be observed particularly that the diaphragms 113 to 116 are unconnected and that they may be moved collectively or individually.

Contained in the casing section 92 are three one-way or loaded check valves 133, 134 and 135, which are yieldingly biased into seated relation on corresponding associated valve seats in such manner as to prevent flow of fluid under pressure from the control pipe 85 and passage 85a therepast to the chambers 123, 124 and 125, respectively, while permitting reverse flow of fluid under pressure from the chambers 123, 124 and 125 respectively to the passage 85a leading to the control pipe 85 whenever the pressure in the chambers exceeds that in the control pipe by a slight amount. The purpose of the check valves 133, 134 and 135 will be made apparent hereinafter.

The magnet valve casing section 95 contains three electromagnet valve devices, hereinafter designated the high magnet valve device 141, the medium magnet valve device 142, and the low magnet valve device 143, which function to control the supply of fluid under pressure to and the release of fluid under pressure from the chambers 123, 124 and 125 respectively.

The high magnet valve device 141 comprises a pair of oppositely seating valves, hereinafter called the supply valve 145 and the release valve 146, which are yieldingly urged by a spring 147 into seated and unseated position, respectively, and which are actuated against the force of the spring 147 to unseated and seated positions, respectively, upon energization of an electromagnet 148. With the release valve 146 unseated as shown, communication is established from a passage 123a, connected to the chamber 123 between the diaphragms 113 and 114, to an atmospheric exhaust passage 151 containing a restricted portion 152, this communication being closed when the release valve 146 is seated. When the supply valve 145 is unseated, communication is established from the passage 85a and the connected control pipe 85 to the passage 123a, this communication being closed when the supply valve 145 is seated.

The medium magnet valve device 142 is identical in construction to the high magnet valve device 141 and comprises a pair of oppositely seating supply and release valves 155 and 156 respectively, which are yieldingly urged into seated and unseated positions, respectively, by a spring 157 and actuated against the force of the spring 157 into unseated and seated positions, respectively, upon energization of an electromagnet 158. With the release valve 156 unseated, as shown, communication is established from a passage 124a, connected to the chamber 124 between the diaphragms 114 and 115, to an atmospheric exhaust passage 161 containing a restricted portion 162, this communication being closed when the release valve 156 is seated. With the supply valve 155 unseated, communication is established from the passage 85a and the connected control pipe 85 to the passage 124a leading to the chamber 114, this communication being closed when the supply valve 155 is seated.

The low magnet valve device 143 comprises a double beat valve 166 which is urged to an upper seated position by a spring 167 and to a lower seated position against the force of spring 167 upon energization of an electromagnet 168. With the double beat valve 156 in its upper seated position, as shown, communication is established from the passage 85a and the connected control pipe 85 to a passage 125a leading to the chamber 125 between the diaphragms 115 and 116. With the double beat valve 166 in its lower seated position, communication from the passage 85a to the passage 125a is closed and another communication is opened through which the passage 125a leading from the chamber 125 is connected to an exhaust passage 171 containing a restricted portion 172, this exhaust communication being closed when the double beat valve is in its upper seated position.

The high, medium and low magnet valve devices 141, 142 and 143 are selectively energized and deenergized by movement of the contact segment 84 which is operated according to the movement of the rotor 52 of the receiver motor 15.

The contact segment 84 comprises an arcuate contact member 175 which is fixed in insulated relation thereon, the contact member 175 being arranged to cooperatively engage a plurality of contact fingers 181, 182 and 183 which are connected by wires 184, 185 and 186, respectively, to corresponding terminals of the electromagnet windings 148, 158 and 168 of the high magnet valve 141, the medium magnet valve 142 and the low magnet valve 143, respectively.

The opposite terminals of the windings 148, 158 and 168 are connected to one terminal of a source of current, such as the battery 18, as through a ground connection in the manner shown. The contact member 175 of the segment 84 is arranged to be connected to the opposite or non-grounded terminal of the battery 18 by the pressure operated switch device 83 whenever the pressure in the control pipe 85 exceeds a certain uniform low pressure such as five pounds per square inch.

As diagrammatically shown, the pressure operated switch device 83 may comprise a casing containing a piston 191 having a stem 192 on which is carried in insulated relation a contact-bridging member 193 for cooperatively connecting in circuit-closing relation a pair of fixed contact members 194, one of which is connected to the non-grounded terminal of the battery 18 and the other of which is connected by a flexible wire 195 to the contact member 175. At one side of the piston 191 is a spring 197 which yieldingly urges the piston downwardly into engagement with the end cover of the casing, in which position the contact-bridging member 193 disengages from the contact members 194 and thus interrupts the connection of the battery 18 to the contact member 175. At the opposite side of the piston 191 is a chamber 198 which is constantly connected to the control pipe 85 through a branch pipe 199.

Whenever the pressure of the fluid supplied into the control pipe 85 and acting in the chamber 198 on the piston 191 is sufficient to overcome the spring 197, the piston 191 is shifted upwardly and the contact-bridging member 193, correspondingly, into circuit-closing engagement with the contact members 194.

The arrangement of the receiver motor 15 and the contact segment 84 is such that as long as the speed of the vehicle or train exceeds a certain high speed, such as sixty miles per hour, the contact member 175 on the contact segment 84 engages only the contact fingers 181 and 182. Thus, when the pressure operated switch 83 is operated to circuit-closing position, only the high magnet valve device 141 and the medium magnet valve device 142 are energized, the low magnet valve device being deenergized.

As the speed of the vehicle reduces, the rotor 52 of the receiver motor 14, and consequently the contact segment 84, is shifted correspondingly in a counterclockwise direction. When the speed of the vehicle reduces below the uniform high speed, such as sixty miles per hour, the contact member 175 disengages the contact member 181, thus effecting deenergization of the high magnet valve 141 while maintaining the medium magnet valve 142 energized.

As the speed of the vehicle reduces from the uniform high speed of sixty miles per hour, the contact segment 175 shifts with respect to the contact finger 182 but remains in contact therewith until the speed of the vehicle reduces to below a medium uniform speed, such as forty miles per hour, at which time the contact member 175 disengages the contact finger 182 and thus effects deenergization of the medium magnet valve 142. Since the contact member 175 has not, thus far, engaged the contact finger 183, the low magnet valve 143 has remained deenergized.

As the speed of the vehicle or train reduces from the medium uniform speed, such as forty miles per hour, the contact segment 84 continues to shift in a counterclockwise direction and the arrangement of the contact member 175 with respect to the contact fingers 181, 182 and 183 is such that it does not engage the contact finger 183 to effect energization of the low magnet valve 143 until the speed of the train reduces to a substantially uniform low speed, such as twenty miles per hour. As the speed of the train reduces below twenty miles per hour, and when the train is completely stopped, contact member 175 remains in engagement with only the contact finger 183 to maintain the low magnet valve device 143 energized, as long as the pressure operated switch device remains in circuit-closing position.

*Operation of equipment shown in Fig. 2*

Assuming that the reservoir 12 is charged to the normal pressure carried therein as from a fluid compressor, not shown, and that the train is traveling along the road at a relatively high speed in excess of the certain uniform high speed of sixty miles per hour, the operator may effect an application of the brakes to a desired degree by shifting the operating handle 86 of the brake valve device 82 from release position into application zone to establish a certain pressure in the control pipe 85. For the purpose of illustration let it be supposed that the operator establishes a fluid pressure in the control pipe 85 of seventy five pounds per square inch.

Since the train is traveling in excess of the uniform high speed of sixty miles per hour, the contact member 175 of the contact segment 84 engages the contact fingers 181 and 182 and thus when the pressure in the control pipe 85 increases sufficiently to operate the pressure operated switch device 83 to circuit-closing position, the high and medium magnet valve devices 141 and 142 are energized.

It will be apparent upon analysis and from previous description that with the high and medium magnet valve devices 141 and 142 energized and the low magnet valve device 143 deenergized, diaphragm chambers 123, 124 and 125 will be supplied with fluid under pressure from and according to the pressure established in the control pipe 85, the chamber 126 at the right of the smallest diaphragm 116 being also charged with fluid under pressure from and at the pressure in the control pipe 85 since it is directly connected thereto through the passage 85a.

Obviously, the fluid pressures on opposite sides of the diaphragms 114, 115 and 116 are equal and thus these diaphragms remain stationary at this time. However, the pressure of the fluid supplied to the chamber 123 and acting on the right-hand face of the largest diaphragm 113 exerts a force to shift the plunger 106 in the left-hand direction to effect operation of the release valve 102 and supply valve 98 in succession, in the manner previously described, to cause fluid under pressure to be supplied from the supply pipe 87 past the supply valve 98 to the chamber 99 and the connected brake cylinder 11.

When the pressure in the brake cylinder 11 and the connected chamber 99 of the control valve mechanism 81 builds up to substantially the pressure established in the control pipe 85 and in the diaphragm chamber 23, the spring 107 shifts the plunger 106 sufficiently in the right-hand direction to lap the supply of fluid under pressure to the brake cylinder. It will be apparent that the pressure established in the control pipe 85 and that established in the brake cylinder 11 are substantially equal, that is they are in one-to-one ratio with respect to each other. Assuming that seventy-five pounds per square inch pressure is established in the control pipe 85, a pressure of seventy-five pounds per square inch is also established in the brake cylinder 11.

When the train reduces in speed below the uniform high speed of sixty miles per hour and the high magnet valve 141 is deenergized as previously described, the diaphragm chamber 123 is vented to atmosphere through the exhaust passage 151 associated with the high magnet valve 141, the rate of reduction of pressure in the chamber 123 being controlled according to the size of the restricted portion 152 of the passage 151. Upon the reduction of the pressure in the chamber 123, the higher brake cylinder pressure effective in chamber 99 on the follower disc 118 associated with the largest diaphragm 113 shifts the diaphragm 113 in the right-hand direction and thus the spring 107 actuates the plunger 106 to effect unseating of the release valve 102 and the consequent release of fluid under pressure from the brake cylinder 11. It will be apparent that the rate of release of fluid under pressure from the brake cylinder 11 will correspond substantially to the rate of reduction of pressure in the diaphragm chamber 123.

When the fluid under pressure in the diaphragm chamber 123 has been completely vented and the chamber 123 is at atmospheric pressure, it will be seen that the force urging the plunger 106 in the left-hand direction is that produced by the fluid pressure in the diaphragm chamber 124 acting over the effective pressure area of the diaphragm 114. As previously stated, the diaphragms 113 to 116 are of successively decreasing area in the order named and for the purpose of more readily understanding the operation of the control valve mechanism 81 let it be assumed that the effective pressure areas of the diaphragms 113, 114, 115 and 116 may be expressed as one hundred units, seventy-five units, fifty units and thirty-three units of area respectively.

It should now be apparent that if the area of the diaphragm 114 is only seventy-five per cent of the area of the diaphragm 113, the force acting to urge the plunger 106 in the left-hand direction at the present time is only seventy-five per cent of that originally established, assuming no change in the assumed pressure of seventy-five pounds per square inch in the control pipe 85. It will, furthermore, be apparent that the pressure established in the brake cylinder 11 at the time that the diaphragm chamber 123 is reduced to atmospheric pressure in the manner just described will be in ratio to the pressure established in the control pipe 85 and effective in the diaphragm chamber 124 according to the ratio between the areas of the diaphragms 114 and 113 respectively. Thus, it will be seen that following the reduction in the speed of the train below the uniform high speed of sixty miles per hour, the brake cylinder pressure will be reduced at a predetermined controlled rate until it attains a pressure of seventy-five per cent of the pressure established in the control pipe 85, at which time no further reduction in brake cylinder pressure will occur. If the fluid pressure in the control pipe 85 is seventy-five pounds per square inch, the reduced pressure thus established in the brake cylinder 11 will be about fifty-six pounds per square inch.

When the train reduces below a medium speed, such as forty miles per hour, and the medium magnet valve device 142 is deenergized due to disengagement of the contact member 175 from the contact finger 182 in the manner previously described, fluid under pressure will accordingly be vented to atmosphere from the diaphragm chamber 124 by way of the exhaust passage 161, the pressure reducing at a rate determined by the restricted portion 162 of the exhaust passage 161. As in the previous instance, the brake cylinder pressure effective in the chamber 99 on the left-hand face of the largest diaphragm 113 overcomes the opposing reducing force of the fluid pressure in the chamber 124, and the spring 107 becomes effective to shift the plunger 106 to again unseat the release valve 102 to cause release of fluid under pressure from the brake cylinder 11 by way of the exhaust port 103, the rate of reduction in brake cylinder pressure corresponding substantially to the rate of reduction of pressure in the chamber 124.

When the fluid under pressure in the diaphragm chamber 124 is entirely vented to atmosphere and atmospheric pressure is established in the chamber 124, the force urging the plunger 106 in the left-hand direction is that produced by the fluid pressure in the chamber 125 acting on the diaphragm 115. Thus, assuming that the diaphragm 115 has an effective pressure area which is fifty per cent of that of the largest diaphragm 113, it will be seen that pressure in the brake cylinder 11 will be reduced to a value which is fifty per cent of that established in the control pipe 85 and diaphragm chamber 125. With seventy-five pounds per square inch pressure established in the control pipe 85, the pressure in the brake cylinder 11 will thus be reduced to about thirty-seven pounds per square inch.

The brake cylinder pressure will remain at a value of fifty per cent of that established in the control pipe 85 until such time as the contact member 175 of the segment 84 associated with the receiver motor 15 is shifted into contact with the contact member 183 to effect energization of the low magnet valve 143. Upon energization of the low magnet valve 143, fluid under pressure in the diaphragm chamber 125 will be released to atmosphere by way of the exhaust passage 171 at a rate determined by the restricted portion 172. As in previous instances, the release valve 102 will be accordingly operated to release fluid under pressure from the brake cylinder 11 at a rate corresponding to the rate of reduction of the pressure in the diaphragm chamber 125 until such time as the fluid in the chamber 125 is reduced to atmospheric pressure.

With the chambers 123, 124 and 125 at atmospheric pressure, the force urging the plunger 106 in the left-hand direction is produced by the fluid under pressure in chamber 126 acting on the smallest diaphragm 116 and thus the fluid in the brake cylinder 11 will be reduced to a pressure which will bear the same ratio to the pressure established in the control pipe 85 as the area of the diaphragm 116 bears to the area of diaphragm 113. If as assumed previously, the diaphragm 116 has an area which is thirty-three per cent of the area of the largest diaphragm 113, it will be apparent that the pressure to which the fluid in the brake cylinder 11 is reduced at this time will be thirty-three per cent of the control pipe pressure of seventy-five pounds per square inch or about twenty-five pounds per square inch. As the train continues to reduce in speed below the uniform low speed of twenty miles per hour, the contact member 175 continues to engage contact member 183 and thus when the vehicle comes to a complete stop, the pressure maintained in the brake cylinder 11 is that determined by the ratio of the area of the smallest diaphragm 116 to the area of the largest diaphragm 113 which ratio, as just explained, is thirty-three per cent of the pressure established in the control pipe 85.

Obviously, since the operator may vary the pressure in the control pipe 85 at will during an application of the brakes, he may increase the pressure in the control pipe 85 to any desired value up to the maximum pressure, such as one hundred pounds per square inch, in which case the pressure established in the brake cylinder at the time the vehicle or train is stopped will be thirty-three pounds per square inch.

Before starting the train, the operator may effect release of the brakes merely by shifting the operating handle 86 of the brake valve device 82 to release position to effect reduction of the pressure in the control pipe 85 and in the connected diaphragm chamber 126 to atmospheric pressure. Upon such reduction of the pressure in the chamber 126, the release valve 102 is operated to release position shown and maintained in such release position to effect the complete release of fluid under pressure from the brake cylinder 11 through the exhaust port 103, thereby effecting complete release of the brakes.

If the train is traveling at some speed within the range between the uniform high speed of sixty miles per hour and the medium speed of forty miles per hour at the time the application of the brakes is initiated, it will be understood that the maximum initial pressure established in the brake cylinder will be seventy-five per cent of the pressure established in the control pipe 85 since the diaphragm chamber 123 is vented to atmosphere due to the fact that the high magnet valve 141 is deenergized. Thereafter as the speed of the train reduces, the medium magnet valve device 142 and the low magnet valve device 143 are successively deenergized and energized, in the manner previously described, to effect the reduction of the brake cylinder pressure in steps to the minimum pressure ratio with respect to the pressure established in the control pipe 85.

In a similar manner also if the train is traveling at a speed within the range between the medium speed of forty miles per hour and the uniform low speed of twenty miles per hour at the time the application of the brakes is initiated, the maximum initial brake cylinder pressure will be fifty per cent of the pressure established in the control pipe 85 due to the fact that both the diaphragm chambers 123 and 124 are vented to atmosphere under the control of the high and medium magnet valves 141 and 142 respectively.

Also in a similar manner, if the application of the brakes is initiated at a time that the train is traveling at a speed below the uniform low speed of twenty miles per hour, the maximum initial brake cylinder pressure will be thirty-three per cent of the pressure established in the control pipe 85.

In the previously described operation, it was assumed that a certain pressure was established in the control pipe 85 and maintained therein throughout the application of the brakes without change. However, in the event that the operator desires to vary pressure in the control pipe 85 during the application of the brakes he may do so by operation of the brake valve device 82. If the pressure in the control pipe 85 is increased from that initially established at the time the application of the brakes is initiated, the pressure in the brake cylinder will be increased substantially immediately according to the increase in pressure in the control pipe 85 since the forces on the diaphragms 113, 114, 115 or 116 will be proportionately varied according to the fluid pressure in the associated diaphragm chambers 123, 124, 125 and 126. In any case, however, the ratio or percentage of the pressure in the brake cylinder with respect to the pressure in the control pipe will not change within any given speed range.

If the operator reduces the pressure in the control pipe 85 during an application of the brakes, the pressures in the diaphragm chambers 123, 124, and 125 are immediately and rapidly reduced to the pressure in the control pipe 85 past the one-way or check valves 133, 134 and 135, respectively, and thus the brake cylinder pressure is reduced according to the reduction of the pressure in the control pipe 85.

Summary

Summarizing, it will be seen that I have disclosed two types of brake equipment embodying my invention. In the first type the pressure in the brake cylinder is controlled continuously and progressively according to the speed of the vehicle, while in the second type the pressure in the brake cylinder is reduced in a succession of predetermined steps as the speed of the train reduces into consecutively lower speed ranges.

A particularly feature of both embodiments is the provision of self-synchronizing motors connected as transmitter and receiver, the transmitter being controlled according to a variable operating condition of the vehicle, such as the speed of the vehicle, and the receiver being effective to control a control valve device controlling the degree of pressure established in the brake cylinder.

While I have shown only two embodiments of my invention, it will be apparent that various omissions, additions or modifications may be made in the embodiments shown without departing from the spirit of my invention. It is, therefore, not my intention to limit the scope of my invention except as it is necessitated by the scope of the prior art.

Having now described my invention, what I claim as new and desire to secure by Letters Patent, is:

1. In a vehicle brake system, the combination with means for effecting an application of the brakes, of a pair of self-synchronizing motors so arranged that the rotor of one of said motors moves synchronously with the rotor of the other of said motors, means for rotarily shifting the rotor of said other motor within a range less than one complete revolution to different positions corresponding to a variable operating condition of the vehicle, and means controlled according to the position of the rotor of said one motor for controlling the degree of application of the brakes.

2. In a vehicle brake system, the combination with means for effecting an application of the brakes, of a pair of self-synchronizing motors so arranged that the rotor of one of said motors moves synchronously with the rotor of the other of said motors, means for rotarily shifting the rotor of said other motor within a range less than one complete revolution to different positions according to the speed of the vehicle, and means controlled according to the position of the rotor of said one motor for controlling the degree of application of the brakes.

3. In a vehicle brake system, the combination with means for effecting an application of the brakes, of a pair of self-synchronizing motors so arranged that the rotor of one of said motors moves synchronously with the rotor of the other of said motors, means for rotarily shifting the rotor of said other motor within a range less than one complete revolution to different positions corresponding to a variable operating condition of the vehicle, and electroresponsive means controlled by the rotor of said one motor for controlling the degree of application of the brakes.

4. In a vehicle brake system, the combination with means for effecting an application of the brakes, of a pair of self-synchronizing motors so arranged that the rotor of one of said motors moves synchronously with the rotor of the other of said motors, means for rotarily shifting the rotor of said other motor within a range less than one complete revolution to different positions according to the speed of the vehicle, and electroresponsive means controlled by the rotor of said one motor for controlling the degree of application of the brakes.

5. In a vehicle brake system, the combination with means for effecting an application of the brakes, of a pair of self-synchronizing motors so arranged that the rotor of one of said motors moves synchronously with the rotor of the other of said motors, means for rotarily shifting the rotor of said other motor within a range less than one complete revolution to different positions corresponding to a variable operating condition of the vehicle, and self-lapping means controlled by the rotor of the said one motor for controlling the degree of application of the brakes.

6. In a vehicle brake system, in combination, a brake cylinder, a pair of self-synchronizing motors so arranged that the rotor of one of said motors moves synchronously with the rotor of the other of said motors, means for rotarily shifting the rotor of said other motor within a range less than one complete revolution to different positions according to a variable operating condition of the vehicle, and self-lapping valve means controlled by the rotor of the said one motor for controlling the degree of pressure established in the brake cylinder.

7. In a vehicle brake system, in combination, brake means, a pair of self-synchronizing motors so arranged that the rotor of one of said motors moves synchronously with the rotor of the other of said motors, means for shifting the rotor of said other motor to different positions according to a variable operating condition of the vehicle, and self-lapping magnet valve means having electroresponsive means and operative to cause application of the brake means to different degrees according to the degree of energization of said electroresponsive means, the rotor of the said one motor being effective to control the degree of energization of said electroresponsive means according to the position thereof.

8. In a vehicle brake system, in combination, brake means, a pair of self-synchronizing motors so arranged that the rotor of one of said motors moves synchronously with the rotor of the other of said motors, means for shifting the rotor of said other motor to different positions according to a variable operating condition of the vehicle, and self-lapping magnet valve means having electroresponsive means and operative to cause application of the brake means to different degrees according to the degree of energization of said electroresponsive means, and current-varying means controlled according to the position of the rotor of said one motor for controlling the degree of energization of said electroresponsive means.

9. In a vehicle brake system, in combination, a brake cylinder, a self-lapping magnet valve means having electroresponsive means and effective to establish different pressures in the brake cylinder according to the current energizing said electroresponsive means, a circuit for supplying current to said electroresponsive means, manually operated means for completing said circuit, current-varying means in said circuit operative to vary the current supplied to the electroresponsive means, a pair of self-synchronizing motors so arranged that the rotor of one of said motors moves synchronously with the rotor of the other of said motors, means for rotarily shifting the rotor of the said other motor according to a variable operating condition of the vehicle, the rotor of the said one motor being arranged to effect the operation of said current-varying means to vary the current in the said circuit according to the position thereof.

10. In a vehicle brake system, in combination, a brake cylinder, a self-lapping magnet valve means having electroresponsive means and effective to establish different pressures in the brake cylinder according to the current energizing the electroresponsive means, a circuit for supplying current to the electroresponsive means, manually operated means normally in a position to open said circuit and operative to a plurality of circuit-closing positions, current-varying means effective to control the degree of current supplied to the electroresponsive means according to the circuit-closing position of the manually operated means, a second current-varying means for controlling the degree of current supplied to the electroresponsive means, a pair of self-synchronizing motors arranged so that the rotor of one of said motors moves synchronously with the rotor of the other of said motors, means for rotarily shifting the rotor of the said other motor to different positions according to a variable operating condition of the vehicle, said second current-varying means being effective to control the degree of current supplied to the electroresponsive means according to the position of the rotor of said one motor.

11. In a vehicle brake system, in combination, brake means, a pair of self-synchronizing motors so arranged that the rotor of one of said motors moves synchronously with the rotor of the other of said motors, means for rotarily shifting the rotor of the other of said motors to different positions according to a variable operating condition of the vehicle, and a plurality of electroresponsive means controlled according to the position of the rotor of said one motor and effective to cause the brake means to effect application of the brakes to different degrees according to whether or not said plurality of electroresponsive means are simultaneously or individually energized or deenergized.

12. In a vehicle brake system, in combination, a brake cylinder, a normally uncharged pipe chargeable with fluid at different pressures, variously conditionable brake control means operative to establish any one of a plurality of different pressures in the brake cylinder in response to charging of said pipe with fluid at a given pressure according to the condition thereof, a pair of self-synchronizing motors so arranged that the rotor of one of said motors moves synchronously with the rotor of the other of said motors, means for rotarily shifting the rotor of the said other motor to different positions according to a variable operating condition of the vehicle, the rotor of said one motor being effective to vary the condition of the said brake control means according to the position thereof.

13. In a vehicle brake system, in combination, a brake cylinder, a normally uncharged pipe chargeable with fluid at different pressures, brake control means variably conditionable and operative to establish any one of a plurality of different pressures in the brake cylinder when the said pipe is charged with fluid at a given pressure depending upon the condition thereof, a pair of self-synchronizing motors so arranged that the rotor of one of said motors moves synchronously with the rotor of the other of said motors, means for rotarily shifting the rotor of the said other motor to different positions according to the speed of the vehicle, the rotor of the said one motor being effective to cause variation of the condition of the brake control means according to the position thereof.

14. In a vehicle brake system, in combination, brake means, a plurality of electroresponsive means effective to cause the brake means to effect application of the brakes to a plurality of different degrees dependent upon the electroresponsive means being simultaneously or individually energized and deenergized, a pair of self-synchronizing motors so arranged that the rotor of one of said motors moves synchronously with the rotor of the other of said motors, means for shifting the rotor of the other of said motors to different positions according to a variable operating condition of the vehicle, and circuit-controlling means operative to a plurality of different positions corresponding to the position of the rotor of said one motor for selectively controlling the said plurality of electroresponsive means.

15. In a vehicle brake system, in combination, brake means, a plurality of electroresponsive means effective to cause the brake means to effect application of the brakes to a plurality of different degrees dependent upon the electroresponsive means being simultaneously or individually energized and deenergized, a pair of self-synchronizing motors so arranged that the rotor of one of said motors moves synchronously with the rotor of the other of said motors, means for shifting the rotor of the other of said motors to different positions according to a variable operating condition of the vehicle, and circuit-controlling means effective to selectively control the energization and deenergization of the plurality of electroresponsive means according to the position of the rotor of said one motor in such manner as to effect reduction in the degree of application of the brakes in a succession of predetermined steps as the speed of the vehicle reduces.

CHARLES W. MALIPHANT.